Nov. 21, 1939. K. SCHLENKER 2,180,612
STARTING DEVICE FOR INTERNAL COMBUSTION ENGINES
Filed July 20, 1938

Inventor
Kurt Schlenker
by Roy F. Steward
his attorney

UNITED STATES PATENT OFFICE 2,180,612

STARTING DEVICE FOR INTERNAL COMBUSTION ENGINES

Kurt Schlenker, Stuttgart, Germany, assignor to Robert Bosch Gesellschaft mit beschränkter Haftung, Stuttgart, Germany Application July 20, 1938, Serial No. 220,351
In Germany July 28, 1937

11 Claims. (Cl. 290—4)

The present invention relates to starting devices for internal combustion engines of the type having an auxiliary internal combustion engine, which latter can be started from a dynamotor through a releasable clutch and is connected in turn with the main engine through a transmission gear and a releasable clutch for the purpose of starting the main engine.

An object of the present invention is to provide a simpler and more compact plant than that already known.

A further object is to reduce the cost of manufacture.

The invention is more particularly described with reference to the accompanying drawing, in which—

Figure 1:
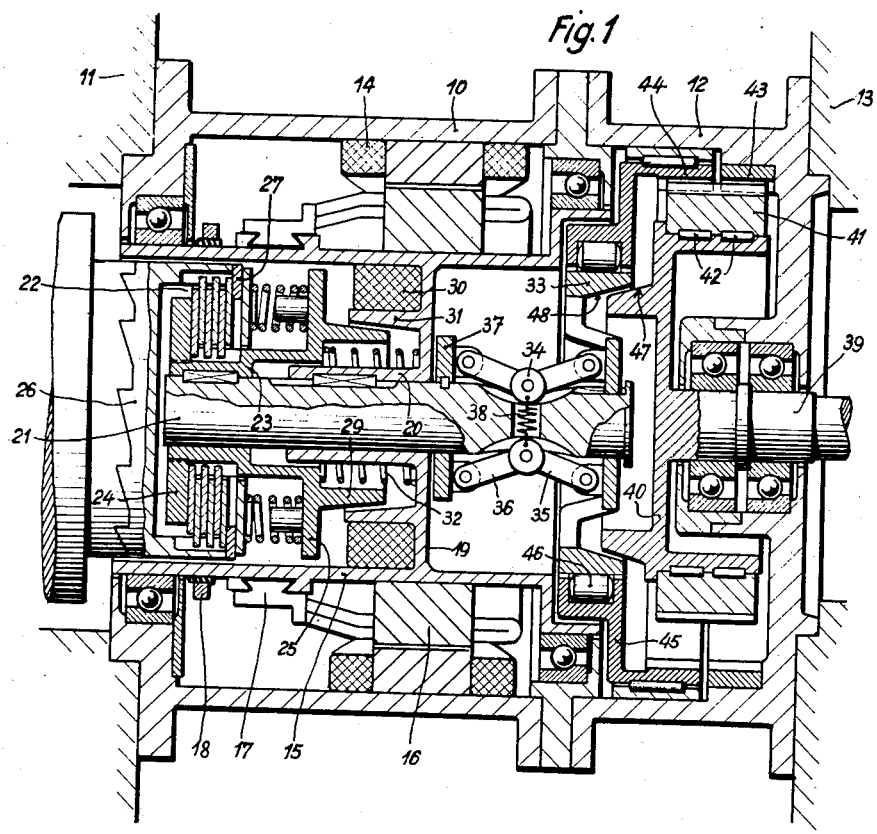
Figure 1 is a starting device in longitudinal section.

In the drawing, 10 is the casing of a dynamotor and is provided with a flange at both ends so that, on one side, it may be fitted to the casing 11 of a main internal combustion engine and so that, on the other side, a gear case 12 can be fitted which is provided between the dynamotor and a small auxiliary internal combustion engine 13. The field windings 14 are mounted in the casing and the armature 16 is mounted on a hollow shaft 15 with the commutator 17 of the dynamotor. In addition, a slip ring 18 is disposed on the hollow shaft so as to be insulated. The hollow shaft is journalled in two bearings at the ends of the casing. Internally, roughly in the middle, the hollow shaft is provided with a disc 19, which carries a sleeve 20 which is located concentrically relative to the hollow shaft. In this sleeve a shaft 21 is disposed which is longitudinally displaceable but is restrained from turning. A friction disc clutch 22 is mounted on the end of the shaft which is nearest the internal combustion engine 11. The inner component of the clutch is formed by a sleeve 23 which is securely keyed on the shaft 21 and is provided at both ends with flanges 24 and 25. The outer component of the clutch is formed by a sleeve which is constructed as a dog 26 and can be brought into engagement with a counter dog of the internal combustion engine. Between the sleeve 23 and the dog sleeve 26 are installed friction discs. To the dog clutch is fitted a snap ring 27, which holds the friction discs in the dog sleeve. An extension 29 to the sleeve is fitted externally to the flange 25, and this continuation forms the armature core of an electro-magnet. The electro-magnet coil 30 is seated on a tubular piece 31 of the part 19. The coil is connected to the slip ring 18. Between the disc 19 and the flange 25 is located a pressure spring 32.

On the other end of the shaft 21 a clutch disc 33 is disposed so as to be longitudinally displaceable but prevented from rotating relative to the shaft 21. On this disc, there engage two jointed levers 34, the middle joint of each of which can swing out under the action of centrifugal force. One arm 35 of the lever is pivotally connected to the disc 33, and the other arm 36 is pivotally connected to a disc 37 which is firmly connected with the shaft 21. The middle joints are drawn in against the shaft 21 by a spring 38. The outer pivotal points on the discs 33 and 37 are remote from the shaft 21 by such a distance that when in the inoperative position the jointed lever is flexed in against the shaft.

The gear case 12 is built on to the casing of the lighting starter. The gear consists of a shaft element 39 mounted in the casing of the gear. A drum 40 is eccentrically secured to the shaft element. A toothed wheel 41 is mounted on the drum by means of rollers 42. The toothed wheel engages in a toothed ring 43, which is firmly fitted internally to the casing of the gear, and in a toothed wheel 44, which is toothed internally and rotatably mounted in the casing. The number of teeth of the ring and of the toothed wheel 44 is different. The toothed wheel has an inwardly projected flange 45, in which are provided cages for receiving rollers 46 of a free-wheel clutch. The periphery of the disc 33, which is displaceable on the shaft 21, forms the working surface of the rollers 46. The drum 40 has a conical extension 47, which forms one component of a friction clutch. The other component to this clutch is formed by the disc 33, which is provided on the inner side with a conical surface 48.

Figure 2:
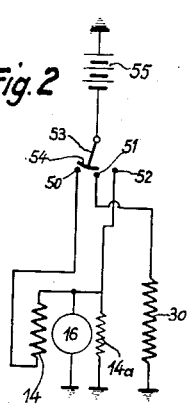
Figure 2 is a switching diagram of the starting device.
Figure 3:
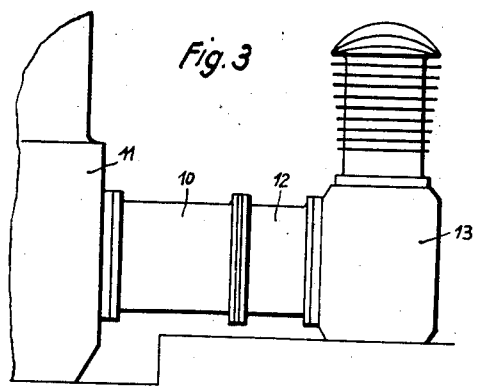
Figure 3 is an elevation of the plant.

Figure 2 shows the switching of the plant. 14 is the series field winding, 14a is the shunt field winding, 16 is the armature of the dynamotor, and 30 is the excitation winding of the electromagnet. For energising the dynamotor and the electromagnet, a switch with three contacts 50, 51, and 52 is provided. The series winding is connected to the contact 50, the shunt winding is connected to the contact 52, and the electro-magnet winding is connected to the contact 51. The switch arm 53 of the switch has a contact element 54 of such width that in certain positions it covers two contacts of the switch. 55 is the battery of the plant.

The starting device operates in the following manner:

To start the main engine, the driver must first start the auxiliary engine by means of the dynamotor. For this purpose, he places the switch arm 53 upon the contacts 50, 51. By this means, the dynamotor is driven as a motor, and the electromagnet is switched in. The electromagnet 30, 31 draws in the sleeve 23 with the friction disc clutch and the shaft 21 against the pressure of the spring 32. As a result, the dog sleeve 26 is disengaged, and the friction clutch 47, 48 is closed. The dynamotor which is working as a motor starts up the auxiliary engine at this switching position. When the auxiliary engine starts up, it drives the dynamotor as a dynamo. The roller free-wheel 46 is then overtaken by the clutch disc 48, and the gear 41—44 runs with it under no load. In this position, the joint 34 cannot be moved out by centrifugal force, because it is flexed inwardly under the pressure of the electromagnet. The driver can now move the switch round onto contacts 51, 52. He thus switches off the series winding 14 of the lighting starter, so that the lighting starting machine works purely as a dynamo. In order to start up the main engine, the driver must place the switch upon the contact 52, whereby the electromagnet is de-energised. The pressure spring 32 then pushes the sleeve 23 with the friction disc clutch and the dog sleeve towards the main engine until the dog 26 engages in the dog of the main engine. At the same time, the clutch 47, 48 is released, so that the auxiliary engine can work on the shaft 21 only through the gear 41—44, 46. As soon as the main engine has commenced to run, the gear is overtaken by the free wheel, and, in addition, the disc is drawn so far towards the disc 37 by the oscillating jointed lever 34, 36 that the disc 33 is drawn away under the rollers 46. The result of this is that the free wheel and the gear are stationary while the main engine is running.

I declare, that what I claim is:

1. A starting device for internal combustion engines comprising, in combination, a dynamotor, an auxiliary internal combustion engine, a releasable clutch and a transmission gear disposed between said dynamotor and said auxiliary engine, said dynamotor being arranged between the main internal combustion engine and said transmission gear.

2. A starting device for internal combustion engines comprising, in combination, a dynamotor, an auxiliary internal combustion engine, a releasable clutch and a transmission gear disposed between said dynamotor and said auxiliary engine, said dynamotor being arranged between the main internal combustion engine and transmission gear, and said clutch and transmission gear being arranged between the dynamotor and said auxiliary internal combustion engine.

3. A starting device for internal combustion engines comprising, in combination, a dynamotor, an auxiliary internal combustion engine, a releasable clutch disposed between said dynamotor and said auxiliary engine through which clutch said auxiliary engine is started up by said dynamotor, a transmission gear disposed between the dynamotor and auxiliary internal combustion engine aforesaid, and a second releasable clutch for transmitting power through said gear for starting up the internal combustion engine.

4. A starting device for internal combustion engines comprising, in combination, a dynamotor, an auxiliary internal combustion engine, a releasable clutch disposed between said dynamotor and said auxiliary engine through which clutch said auxiliary engine is started up by said dynamotor, a transmission gear disposed between the dynamotor and auxiliary internal combustion engine aforesaid, and a second releasable clutch for transmitting power through said gear for starting up the internal combustion engine, wherein one of the components of each of the two said clutches are interconnected for the purpose of common axial displacement.

5. A starting device for internal combustion engines comprising, in combination, a dynamotor, an auxiliary internal combustion engine, a releasable clutch disposed between said dynamotor and said auxiliary engine through which clutch said auxiliary engine is started up by said dynamotor, a transmission gear disposed between the dynamotor and auxiliary internal combustion engine aforesaid, and a second releasable clutch for transmitting power through said gear for starting up the internal combustion engine, wherein one of the components of each of the two said clutches are interconnected for the purpose of common axial displacement, by an electromagnet.

6. A starting device for internal combustion engines comprising, in combination, a dynamotor, an auxiliary internal combustion engine, a releasable clutch disposed between said dynamotor and said auxiliary engine through which clutch said auxiliary engine is started up by said dynamotor, a transmission gear disposed between the dynamotor and auxiliary internal combustion engine aforesaid, and a second releasable clutch for transmitting power through said gear for starting up the internal combustion engine, wherein one of the components of each of the two said clutches are interconnected for the purpose of common axial displacement, by an electromagnet, and the said clutches and electromagnet are accommodated within a hollow armature shaft of said dynamotor.

7. A starting device according to claim 6, in which a shaft disposed inside the said hollow armature shaft carries one component of the said releasable clutch which is between said dynamotor and said auxiliary engine at one end, and a friction disc clutch at the opposite end.

8. A starting device according to claim 6, wherein a shaft which serves to connect the two clutches aforesaid is disposed inside the said hollow armature shaft and carries one component of the said releasable clutch which is between said dynamotor and said auxiliary engine at one end, and a friction disc clutch at the opposite end.

9. A starting device for internal combustion engines comprising, in combination, a dynamotor, an auxiliary internal combustion engine, a releasable clutch disposed between said dynamotor and said auxiliary engine, a transmission gear and a second releasable clutch between said dynamotor and the internal combustion engine to be started, and a free wheel roller clutch a driven component of which forms one component of the said releasable clutch for transmitting power for starting up the internal combustion engine from said auxiliary engine which has itself been previously started up by said dynamotor.

10. A starting device for internal combustion engines comprising, in combination, a dynamotor, an auxiliary internal combustion engine, a releasable clutch disposed between said dynamotor and said auxiliary engine, a transmission gear and a second releasable clutch between said dynamotor and the internal combustion engine to be started, and a free wheel roller clutch a driven component of which forms one component of the said releasable clutch for transmitting power for starting up the internal combustion engine from said auxiliary engine which has itself been previously started up by said dynamotor, wherein parts of the two said clutches which are not common to both the said clutches are so disposed that the said releasable clutch is situated substantially within the periphery of the roller free wheel clutch aforesaid.

11. A starting device according to claim 10, wherein the said driven component of the free wheel clutch can be axially displaced by a centrifugal means whereby said clutch is entirely cut out.

KURT SCHLENKER.